United States Patent [19]
Aizu et al.

[11] 3,764,197
[45] Oct. 9, 1973

[54] FERROELASTIC DEVICE

[75] Inventors: Keiichiro Aizu, Tokyo; Akio Kumada, Kodaira-shi; Masashi Koga, Kokubunji-shi, all of Japan

[73] Assignee: Hitachi, Ltd., Tokyo, Japan

[22] Filed: July 28, 1971

[21] Appl. No.: 166,663

Related U.S. Application Data
[63] Continuation-in-part of Ser. No. 862,619, Sept. 9, 1969.

[30] Foreign Application Priority Data
Sept. 13, 1968 Japan.................................. 43/65586

[52] U.S. Cl.................................. 350/161, 356/32
[51] Int. Cl.............................................. G02f 1/16
[58] Field of Search..................... 356/32; 350/161, 350/149

[56] References Cited
UNITED STATES PATENTS
| | | | |
|---|---|---|---|
| 3,586,415 | 6/1971 | Kumda et al. | 350/149 |
| 1,694,661 | 12/1928 | Meissner | 350/149 |
| 3,539,244 | 11/1970 | Marks | 350/161 |

OTHER PUBLICATIONS
M. Bruzav, "Piezoelectric Substances," Electrical Communication Vol. 23, pp. 445–459, 1946.

*Primary Examiner*—William L. Sikes
*Attorney*—Craig, Antonelli & Hill

[57] ABSTRACT

Ferroelastic materials vary in their even-rank polar tensorial properties or similar anisotropic properties when they are shifted from one orientation state to another. A body of such ferroelastic material is combined with means for applying stress above a certain value thereonto to cause a transition of the orientation state.

9 Claims, 15 Drawing Figures

PATENTED OCT 9 1973 3,764,197

STATE (a)  STATE (b)
a > b  a < b

INVENTORS
KEIICHIRO AIZU,
AKIO KUMADA AND
MASASHI KOGA

BY Craig, Antonelli & Hill
ATTORNEYS

INVENTORS
KEIICHIRO AIZU,
AKIO KUMADA AND
MASASHI KOGA

BY Craig, Antonelli & Hill
ATTORNEYS

FERROELASTIC DEVICE

CROSS-REFERENCE TO RELATED APPLICATION

This application is a continuation-in-part of application Ser. No. 862,619 filed Sept. 9, 1969, now abandoned and is related to application Ser. No. 166,664, filed July 24, 1971, having U.S. Pat. No. 3,710,286.

BACKGROUND OF THE INVENTION

1. Field of the Invention

This invention relates to a device employing ferroelastic material utilizing the change in an even-rank tensorial property or a similar anisotropic property of the ferroelastic material caused by the state shift and to a ferroelastic element comprising a body of a ferroelastic crystal and means for causing such a state shift.

2. Description of the Prior Art

As is well known, ferroelectric materials have two or more different orientation states (polarization) under a normal state (i.e., in the absence of electric field and mechanical stress). When an electric field above a certain value is applied to such ferroelectric materials, their polarization can be shifted from one orientation to another. For example, potassium dihydrogen phosphate (which will hereinafter be abbreviated as KDP in this specification) has two opposite polarization states in the absence of an electric field and stress and one spontaneous polarization can be shifted to another by the application of an electric field above 1,000 V/cm. Here, the crystal structure of a KDP crystal is equivalent to a rotation by 180° or a mirror image upon the polarization reversal. (Some ferroelastic materials have the same crystal structure for different orientation states.)

The electric polarization is a polar vector, i.e., a property expressed as a first-rank polar tensor and has the following properties:

1. All the other first-rank polar tensorial properties change upon the change of the electric polarization on the one hand; and 2. The electric polarization changes upon the change of an arbitrary first rank polar tensorial property on the other hand.

In short, ferroelectric materials have such a tendency that the first-rank polar tensorial properties change upon a state transition.

Further, not only the first-rank but also all the higher odd-rank polar tensorial properties change upon the change of the electric polarization.

Physical quantities having an odd-rank tensorial property include such quantities as the piezoelectric modulus, electro-optic coefficient, coefficient of higher harmonic generation, etc.

The present inventors have found that some crystals, such as gadolinium molybdate, vanadium dioxide, KDP, etc., have two or more different orientation states (a) and (b) as will be seen in FIG. 1 and the transition between different orientation states such as from state (a) to (b) or (b) to (a) can be achieved by the application of a mechanical stress of 100 kg/cm$^2$ or more in a direction perpendicular to the two axes $b$ and $c$ of the crystal. Such crystals show a squarish strain $x$ vs. stress X hysteresis property, as will be seen in FIG. 2, and flips over from one strain orientation state AB to another state CD by the application of a stress above a certain value (the critical value being indicated at Xc in FIG. 2 and hereinafter referred to as the "coercive stress"). The two orientation states are enantimorphous in their crystal structure. The present inventors call materials having such properties "ferroelastic material" after ferroelectric material, in this specification.

According to the study of the inventors, a ferroelastic material generally performs a phase transition into the paraelectric phase. Two ferroelastic materials are called as belonging to the same "species" when their point groups and the point groups of their corresponding paraelectric phases are both identical. Then, there are theoretically 94 possible species as listed in Table 1. Each species is expressed by a letter F with a prefix and suffix. The prefix designates the point group of the corresponding paraelectric phase and the suffix designates the point group of the ferroelastic material itself. Numerals 2, 3, 4 and 6 in prefix or suffix denote two-, three-, four- and six-fold axes of symmetry of the point group respectively, and numerals with bars $\bar{3}, \bar{4}$ and $\bar{6}$ denote $2\pi/3$, $2\pi/4$ and $2\pi/6$ rotational enantimorphism. Reference $m$ denotes a mirror plane. Further, for example, 4 $m$ denotes that the four-fold axes of symmetry and the mirror plane are parallel to each other and 4/$m$ denotes they are perpendicular to each other. Numerals in the second column denote the total number of orientation states belonging to respective species and in the third column materials belonging to respective species are listed. Symbols in brackets (P) and (S) in the first column express the following states:

a. When the paraelastic phase belongs to the non-cubic system, (P) denotes that the crystallographic unique axis of the ferroelastic phase lies along the crystallographic unique axis of the paraelastic phase; and b. When the paraelastic phase belongs to the cubic system, (P) denotes that the unique or an important axis of the ferroelastic phase lies along one of the cubic principal axes of the paraelastic phase and (S) denotes that the unique or an important axis of the ferroelastic phase lies along one center line of the diagonal planes of the cubic lattice of the paraelastic phase.

According to the above-described classification, gadolinium molybdate, KDP and vanadium dioxide belong to species $\bar{4}2$ mFmm2, $\bar{4}2$ mFmm2 and 4/mmmF2/m(S), respectively.

TABLE 1

| Species | Number of states | Examples |
|---|---|---|
| 2F1 | 2 | |
| mF1 | 2 | |
| 2/mF$\bar{1}$ | 2 | |
| 222F1 | 4 | |
| 222F2 | 2 | Rochelle salt |
| mm2F1 | 4 | |
| mm2F2 | 2 | |
| mm2Fm | 2 | |
| mmmF$\bar{1}$ | 4 | |
| mmmF2/m | 2 | |
| 4F1 | 4 | |
| 4F2 | 2 | |
| $\bar{4}$F1 | 4 | |
| $\bar{4}$F2 | 2 | |
| 4/mF$\bar{1}$ | 4 | |
| 4/mF2/m | 2 | |
| 422F1 | 8 | |
| 422F2(S) | 4 | |
| 422F2(P) | 4 | |
| 422F222 | 2 | |
| 4mmF1 | 8 | |
| 4mmF2 | 4 | |
| 4mmFm | 4 | |
| 4mmFmm2 | 2 | |
| $\bar{4}$2mF1 | 8 | |
| $\bar{4}$2mF2(S) | 4 | |
| $\bar{4}$2mF2(P) | 4 | |

| | |
|---|---|
| 4̄2mFm | 4 |
| 4̄2mF222 | 2 |
| 4̄2mFmm2 | 2 |
| 4/mmmF1̄ | 8 |
| 4/mmmF2/m(S) | 4 |
| 4/mmmF2/m(P) | 4 |
| 4/mmmFmmm | 2 |
| 3F1 | 3 |
| 3̄F1̄ | 3 |
| 32F1 | 6 |
| 32F2 | 3 |
| 3mF1 | 6 |
| 3mFm | 3 |
| 3̄mF1̄ | 6 |
| 3̄mF2/m | 3 |
| 6F1 | 6 |
| 6F2 | 3 |
| 6̄F1 | 6 |
| 6̄Fm | 3 |
| 6/mF1̄ | 6 |
| 6/mF2/m | 3 |
| 622F1 | 12 |
| 622F2(S) | 6 |
| 622F2(P) | 6 |
| 622F22 | 3 |
| 6mmF1 | 12 |
| 6mmF2 | 6 |
| 6mmFm | 6 |
| 6mmFmm2 | 3 |
| 6̄m2F1 | 12 |
| 6̄m2F2 | 6 |
| 6̄m2Fm(S) | 6 |
| 6̄m2Fm(P) | 6 |
| 6̄m2Fmm2 | 3 |
| 6/mmmF1̄ | 12 |
| 6/mmmF2/m(S) | 6 |
| 6/mmmF2/m(P) | 6 |
| 6/mmmFmmm | 3 |
| 23F1 | 12 |
| 23F2 | 6 |
| 23F222 | 3 |
| 23F3 | 4 |
| m3F1̄ | 12 |
| m3F2/m | 6 |
| m3Fmmm | 3 |
| m3F3̄ | 4 |
| 432F1 | 24 |
| 432F2(S) | 12 |
| 432F2(P) | 12 |
| 432F222(SS) | 6 |
| 432F222(PP) | 6 |
| 432F422 | 3 |
| 432F32 | 4 |
| 4̄3mF1 | 24 |
| 4̄3mF2 | 12 |
| 4̄3mFm | 12 |
| 4̄3mF222 | 6 |
| 4̄3mFmm2 | 6 |
| 4̄3mF4̄2m | 3 |
| 4̄3mF3m | 4 |
| m3mF1̄ | 24 |
| m3mF2/m(S) | 12 |
| m3mF2/m(P) | 12 |
| m3mFmmm(SS) | 6 |
| m3mFmmm(PP) | 6 |
| m3mF4/mmm | 3 |
| m3mF3̄m | 4 |

Gd$_2$(MoO$_4$)$_3$, KDP

Vanadium dioxide

Methylammonium aluminum sulfate dodecahydrate ammonium cadmium sulfate

"Ferroelastic materials" change their strain in accordance with the state transition of strain. The strain is, as is well known, one of the properties expressed as second-rank polar tensors. Generally, when an arbitrary second-rank polar tensorial property changes, all the other second-rank polar tensorial properties and further all the higher even-rank polar tensorial properties also change. Namely, all the even-rank (second-rank, fourth-rank, .....) polar tensorial properties of a ferroelastic material change in accompany with a state transition. Examples of second-rank polar tensorial properties are refractivity, electric susceptibility, electrical conductivity, thermal conductivity, coefficient of thermal expansion, etc. and examples of fourth-rank polar tensorial properties are modulus of elasticity, and coefficient of electrostriction.

The manner of change of these even-rank polar tensorial properties, i.e., how they change in accordance with a state transition, is made clear for respective species. Taking species 4̄2mFmm2 as an example, $x$, $y$ and $z$ coordinate axes are taken in such a manner that the $z$-axis is parallel to the four-fold axis of symmetry and $x$- and $y$-axes are perpendicular to the two mirror planes of symmetry in paraelastic phase. In the paraelastic phase, strain expressed as a tensor:

$$\begin{pmatrix} \dfrac{\partial u_x}{\partial x} & \dfrac{1}{2}\left(\dfrac{\partial u_x}{\partial y}+\dfrac{\partial u_y}{\partial x}\right) & \dfrac{1}{2}\left(\dfrac{\partial u_x}{\partial z}+\dfrac{\partial u_z}{\partial x}\right) \\ \dfrac{1}{2}\left(\dfrac{\partial u_x}{\partial y}+\dfrac{\partial u_y}{\partial x}\right) & \dfrac{\partial u_y}{\partial y} & \dfrac{1}{2}\left(\dfrac{\partial u_y}{\partial z}+\dfrac{\partial u_z}{\partial y}\right) \\ \dfrac{1}{2}\left(\dfrac{\partial u_z}{\partial x}+\dfrac{\partial u_x}{\partial z}\right) & \dfrac{1}{2}\left(\dfrac{\partial u_z}{\partial y}+\dfrac{\partial u_y}{\partial z}\right) & \dfrac{\partial u_z}{\partial z} \end{pmatrix} \quad (1)$$

changes in accordance with a state transition. Here, $u$ denotes displacement and $u_x$, $u_y$ and $u_z$ denote $x$, $y$ and $z$ components of the displacement, respectively.

In crystals belonging to species 4̄2mFmm2, the strain tensor (1) becomes $$\begin{pmatrix} \dfrac{\partial u_x}{\partial x} & 0 & 0 \\ 0 & \dfrac{\partial u_y}{\partial y} & 0 \\ 0 & 0 & \dfrac{\partial u_z}{\partial z} \end{pmatrix} \quad (2)$$

The strain tensor (2) generally shows the property of a second-rank polar tensor $$\begin{pmatrix} a & 0 & 0 \\ 0 & b & 0 \\ 0 & 0 & c \end{pmatrix} \quad (3)$$

which shifts into $$\begin{pmatrix} b & 0 & 0 \\ 0 & a & 0 \\ 0 & 0 & c \end{pmatrix} \quad (4)$$

upon the state transition of the crystal since its structures before and after the transition are in the relation of $\pi/2$ rotation and mirror reflection. As is described hereinbefore, refractivity, electric susceptibility, electrical conductivity, thermal conductivity, coefficient of thermal expansion, etc., are also second-rank polar tensors and have the above property in common.

Further, the quantity of elasticity $dF/ds$, the ratio of stress F to displacement s of a ferroelastic body, also shows the state or stress at a particular point in a ferroelastic body. Thus, we will take cartesian coordinates $x, y, z$ with the origin at this particular point. The stress perpendicularly acting from $+x$ side of the yz plane to $-x$ side will be designated as $X_x$ and the tangential stresses as $Y_x$ and $Z_x$. Therefore, stresses $X_y$, $Y_y$ and $Z_y$ act on the zx plane and stresses $X_z$, $Y_z$ and $Z_z$ on the xy plane. When these nine quantities are given at a particular point C, mutual interaction on an arbitrary interface at said point can be determined. These nine quantities are, however, not independent but satisfy the following equations:

$$X_y = Y_x, \quad Y_z = Z_y \text{ and } Z_x = X_z.$$

Namely, a stress tensor is symmetric.

When displacement components along $x$-, $y$- and $z$-axes induced by such stress in a ferroelastic body are denoted by $u$, $v$ and $w$, the modulus of elasticity is expressed by $$\begin{pmatrix} a_{11}\frac{\partial u}{\partial x} & a_{12}\frac{\partial v}{\partial y} & a_{13}\frac{\partial w}{\partial z} & a_{14}\left(\frac{\partial w}{\partial y}+\frac{\partial v}{\partial z}\right) & a_{15}\left(\frac{\partial u}{\partial z}+\frac{\partial w}{\partial x}\right) & a_{16}\left(\frac{\partial v}{\partial x}+\frac{\partial u}{\partial y}\right) \\ a_{21}\frac{\partial u}{\partial x} & a_{22}\frac{\partial v}{\partial y} & a_{23}\frac{\partial w}{\partial z} & a_{24}\left(\frac{\partial w}{\partial y}+\frac{\partial v}{\partial z}\right) & a_{25}\left(\frac{\partial u}{\partial z}+\frac{\partial w}{\partial x}\right) & a_{26}\left(\frac{\partial v}{\partial x}+\frac{\partial u}{\partial y}\right) \\ a_{31}\frac{\partial u}{\partial x} & a_{32}\frac{\partial v}{\partial y} & a_{33}\frac{\partial w}{\partial z} & a_{34}\left(\frac{\partial w}{\partial y}+\frac{\partial v}{\partial z}\right) & a_{35}\left(\frac{\partial u}{\partial z}+\frac{\partial w}{\partial x}\right) & a_{36}\left(\frac{\partial v}{\partial x}+\frac{\partial u}{\partial y}\right) \\ a_{41}\frac{\partial u}{\partial x} & a_{42}\frac{\partial v}{\partial y} & a_{43}\frac{\partial w}{\partial z} & a_{44}\left(\frac{\partial w}{\partial y}+\frac{\partial v}{\partial z}\right) & a_{45}\left(\frac{\partial u}{\partial z}+\frac{\partial w}{\partial x}\right) & a_{46}\left(\frac{\partial v}{\partial x}+\frac{\partial u}{\partial y}\right) \\ a_{51}\frac{\partial u}{\partial x} & a_{52}\frac{\partial v}{\partial y} & a_{53}\frac{\partial w}{\partial z} & a_{54}\left(\frac{\partial w}{\partial y}+\frac{\partial v}{\partial z}\right) & a_{55}\left(\frac{\partial u}{\partial z}+\frac{\partial w}{\partial x}\right) & a_{56}\left(\frac{\partial v}{\partial x}+\frac{\partial u}{\partial y}\right) \\ a_{61}\frac{\partial u}{\partial x} & a_{62}\frac{\partial v}{\partial y} & a_{63}\frac{\partial w}{\partial z} & a_{64}\left(\frac{\partial w}{\partial y}+\frac{\partial v}{\partial z}\right) & a_{65}\left(\frac{\partial u}{\partial z}+\frac{\partial w}{\partial x}\right) & a_{66}\left(\frac{\partial v}{\partial x}+\frac{\partial u}{\partial y}\right) \end{pmatrix} \quad (5)$$

When a ferroelastic crystal belongs to species $\overline{4}2mFmm2$, however, the matrix (5) can be written in a simpler form as $$\begin{pmatrix} a_{11} & a_{12} & a_{13} & a_{14}(0) & a_{15}(0) & a_{16}(0) \\ a_{21} & a_{22} & a_{23} & a_{24}(0) & a_{25}(0) & a_{26}(0) \\ a_{31} & a_{32} & a_{33} & a_{34}(0) & a_{35}(0) & a_{36}(0) \\ 0 & 0 & 0 & a_{44}\left(\frac{\partial w}{\partial y}+\frac{\partial v}{\partial z}\right) & 0 & 0 \\ 0 & 0 & 0 & 0 & a_{55}\left(\frac{\partial y}{\partial z}+\frac{\partial w}{\partial x}\right) & 0 \\ 0 & 0 & 0 & 0 & 0 & a_{66}\left(\frac{\partial v}{\partial x}+\frac{\partial u}{\partial y}\right) \end{pmatrix} \quad (6)$$

from the relation of symmetry. This elasticity tensor can be rewritten as $$\begin{pmatrix} T_{11} & T_{12} & T_{13} & 0 & 0 & 0 \\ T_{21} & T_{22} & T_{23} & 0 & 0 & 0 \\ T_{31} & T_{32} & T_{33} & 0 & 0 & 0 \\ 0 & 0 & 0 & T_{44} & 0 & 0 \\ 0 & 0 & 0 & 0 & T_{55} & 0 \\ 0 & 0 & 0 & 0 & 0 & T_{66} \end{pmatrix} \quad (7)$$

and can be shifted to $$\begin{pmatrix} T_{22} & T_{21} & T_{23} & 0 & 0 & 0 \\ T_{12} & T_{11} & T_{13} & 0 & 0 & 0 \\ T_{32} & T_{31} & T_{33} & 0 & 0 & 0 \\ 0 & 0 & 0 & T_{44} & 0 & 0 \\ 0 & 0 & 0 & 0 & T_{55} & 0 \\ 0 & 0 & 0 & 0 & 0 & T_{66} \end{pmatrix} \quad (8)$$

by a state transition.

Another example of such fourth-rank polar tensorial property is the coefficient of electrostriction.

Further, other higher-rank polar tensorial properties also change in response to a state transition. Thus, in ferroelastic material, all the even-rank (second-rank, fourth-rank, . . . ) polar tensorial properties change with a state transition.

Species $\overline{4}2m F mm2$ has been described hereinabove, but other species can be similarly explained.

SUMMARY OF THE INVENTION

An object of this invention is to provide a ferroelastic device utilizing a change in an even-rank polar tensorial property or similar anisotropic property of a ferroelastic body induced by a state transition of the crystal structure.

Another object of the present invention is to provide a microwave power controlling device employing such a ferroelastic material.

A further object of the present invention is to provide a light path deflecting device employing such a ferroelastic material.

DESCRIPTION OF THE PREFERRED EMBODIMENTS

Figure 1:
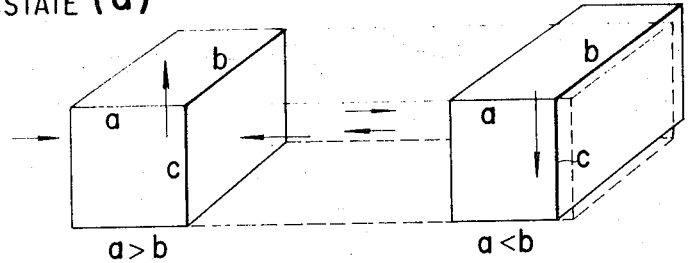
FIG. 1 shows the manner of change of lattice state of a ferroelastic material induced by the orientation state transition.
Figure 2:
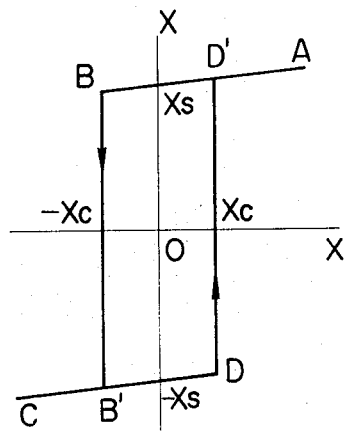
FIG. 2 is a stress vs. strain hysteresis curve of a ferroelastic material.

FIG. 1 shows the manner of state transition of a ferroelastic body wherein letters $a$, $b$ and $c$ represent crystal axes. When a pressure above a certain value is applied perpendicularly to the $bc$ plane, $a$-axis contracts and $b$-axis expands as can be seen from the state (a) to the state (b) in FIG. 1, which is equivalent to the fact that the $a$- and $b$-axes are exchanged. In this step, the crystal structure or strain state is also changed as marked by arrows of opposite sense. The strain state shows a hysteresis phenomenon as is seen in strain vs. stress curve of FIG. 2.

This invention employs ferroelastic material as is listed in Table 1 and utilizes the transition of the orientation state thereof induced by the application of a stress. The direction in which a stress is applied to a ferroelastic body to induce the state transition is determined in accordance with the species to which the ferroelastic body belongs. Species $\overline{4}2m F mm2$ will be taken as an example.

Figure 3A:
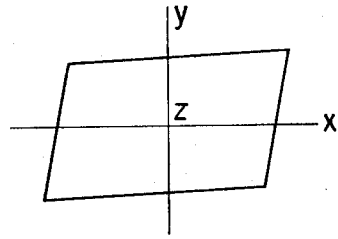
FIGS. 3a and 3b schematically show unit lattices of a crystal belonging to species 222F2 in two different orientation states.
Figure 3B:
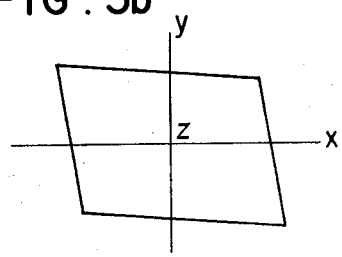

Taking the z-axis as parallel to the four-fold axis of symmetry (symmetry axis for $\pi/2$ rotation) and the $x$- and $y$-axes as parallel to the two two-fold axes of symmetry, a unit lattice of a ferroelastic crystal of species $\overline{4}2m F mm2$ assumes the orientations shown in FIGS. 3a and 3b in the two orientation states. A crystal in the state of FIG. 3a can be shifted into the state of FIG. 3b by either applying pressure to the crystal surface perpendicular to the $x$-axis, applying tension to the crystal surface perpendicular to the $y$-axis, applying both these pressure and tension simultaneously, or by applying a shearing stress along a crystal plane inclined at an angle of 45° or another with the $x$- and $y$-axes. The reverse transition is possible by applying stress in an opposite direction.

In the case of species 222F2, such as Rochelle salt, when the $x$-, $y$- and $z$-axes are taken parallel to the three two-fold axes of symmetry in paraelastic phase ($z$-axis being parallel to the two-fold axis of symmetry in ferroelastic phase), a unit lattice of ferroelastic material belonging to this species takes the orientation states of FIGS. 3a and 3b. The state transition in this species can be achieved by applying a shearing stress along two pairs of crystal planes perpendicular to the $x$- and $y$-axes or by applying pressure or tension to a pair of parallel crystal planes forming an angle of 45° with both $x$- and $y$-axes.

In this case, further, the state transition will be facilitated if a pair of electrodes are provided on the crystal surfaces perpendicular to the $z$ axis and short-circuited, since any electrostatic reaction during the reversion of polarization will be eliminated by these electrodes.

By utilizing the phenomenon that even-rank polar tensorial properties change with the state transition of strain, ferroelastic material can be used as a modulation element utilizing the change in (a) refractivity, (b) absorption of the infrared rays, (c) electric susceptibility or electric conductivity or (d) modulus of elasticity, a memory element in which information is written by stress and from which information is read destructively, or a memory element in which information is written by stress and from which information is read nondestructively by light rays or the like.

Incidentally, when the z coordinate axis is set along the axis of four-fold symmetry of a crystal in the paraelastic phase, and the x- and y-axes are set perpendicular to two symmetric mirror planes as has been stated above, the coordinate axes $x$, $y$ and $z$ coincide with the $a$-, $b$- and $c$-axes, respectively, of a crystal of species $\overline{4}2mFmm2$.

Now, examples of the device according to the present invention will be described.

EXAMPLE 1

Figure 4:
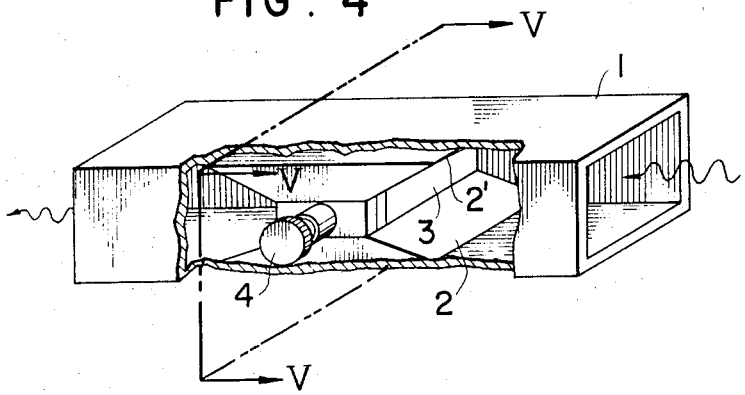
FIG. 4 is a schematic diagram of an embodiment of the invention.
Figure 5:
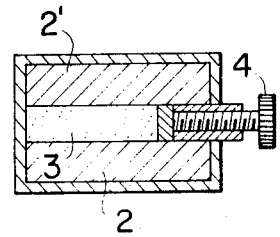
FIG. 5 is a transverse cross-section of FIG. 4 taken along plane V—V.

As shown in FIG. 4, tapered supports 2 and 2' of copper for placing a crystal thereon are disposed at the central portion in a copper wave guide 1 having a height of 10.2 mm and width of 22.9 mm. Between the supports is interposed a gadolinium molybdate (hereinafter referred to as GMO) single crystal element 3 which is cut in such a manner that its three pairs of opposite parallel surfaces are perpendicular to its $a$, $b$ and $c$ axes, respectively, with its z surfaces (surfaces perpendicular to the c axis) being kept in parallel abutment against the parallel opposite surfaces of the supports 2 and 2'. The y surfaces (surfaces perpendicular to the $b$ axis) of the singla crystal element 3 are arranged to be perpendicular to the axial direction of the wave guide 1. One of the x surfaces (surfaces perpendicular to the a axis) of the element 3 is stuck onto the rigid wall of the wave guide 1 with an epoxy resin adhesive, while to the other x surface is adhered by a binder one end of a threaded member 4 assembled with an internally threaded member stuck with an epoxy resin binder to the wall of the wave guide 1 so that the threaded member 4 can move forward and backward along a direction perpendicular to the axial direction of the wave guide as shown in FIG. 5 (a transverse cross section of the wave guide 1). If, with such a screw mechanism as adopted, a pressure of 100 kg/cm$^2$ is applied to the x planes of the GMO single crystal element 3 by turning the threaded member 4 in, for example, a clockwise direction, then the element 3 will shift from its existing state to its another state of strain, increasing its dimension along the axial direction of the waveguide 1 and decreasing its dimension along the direction perpendicular to the axis of the wave guide 1. The variation of the strain state of the element 3 will cause the variation in the dielectric constant $\epsilon$ of the element (a second-rank polar tensor) so that the power of a microwave, for example, of 10 GHz, travelling in the wave guide will vary in response to the variation in the dielectric constant $\epsilon$ of the element.

In a similar manner, by turning the knob of the threaded member 4 in the opposite or counterclockwise direction, the element 3 experiences a tension and it returns to its initial state (hence, also the dielectric constant $\epsilon$) so that the power of the microwave travelling through the wave guide will be restored to its initial value. So, the screw-operated element serves as a microwave power modulator device.

Figure 6:
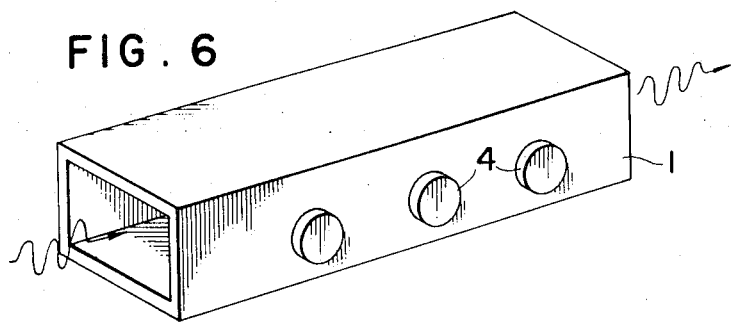
FIG. 6 schematically shows another embodiment of the invention.

If, as shown in FIG. 6, N such microwave power modulator devices as described above in conjunction with FIGS. 4 and 5 are provided in series along the axis of the wave guide 1, the range of microwave power control will be $2^{N-1}$ times as great as that of a single stage modulation system as shown in FIG. 4.

In these embodiments, the two opposite z surfaces of the GMO single crystal element 3 of each modulator device are kept in contact with the tapered supports 2 and 2' so that the two surfaces are short circuited with each other. It is not necessary to connect the two z surfaces together electrically, but such short circuit connection enables a stress and a tension to be less than the coercive stress to be sufficiently useful for power modulation.

EXAMPLE 2

Figure 7A:
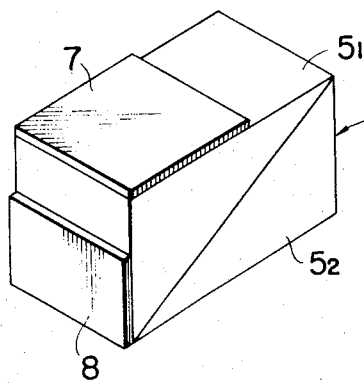
FIGS. 7a, 7b, 7c and 7d are schematic diagrams showing various aspects of an optical shutting device according to the present invention.
Figure 7B:
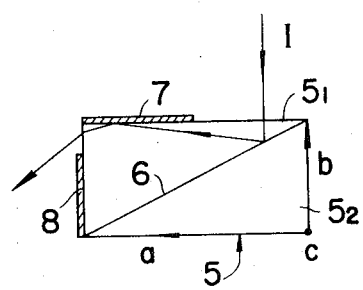
Figure 7C:
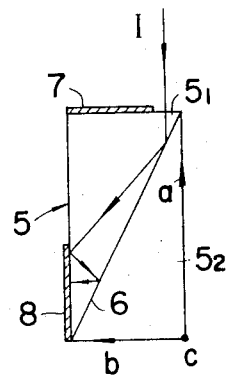

A KDP single crystal in the form of a parallelepiped having its parallel opposite surfaces perpendicular to the $a$, $b$ and $c$ axes of the single crystal, respectively, is cut along a plane parallel to the $c$ axis and making an angle smaller than 45° with the $a$ or $b$ axis into two pieces $5_1$ and $5_2$, as shown in FIGS. 7a, 7b and 7c.

Figure 7D:
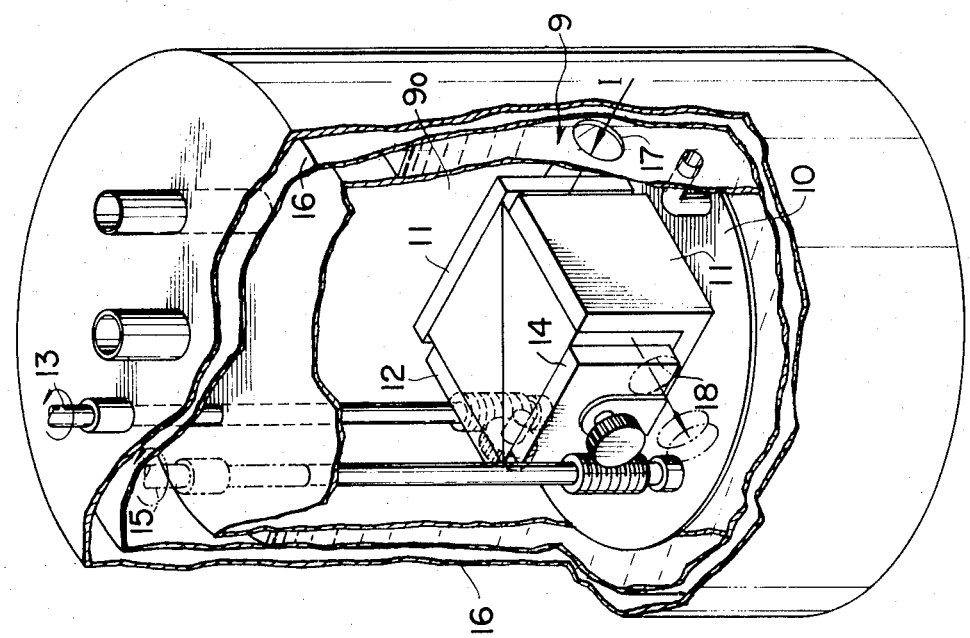

Aluminum films are deposited on the cut surfaces of the split pieces by vapor deposition. Thereafter, the split pieces are put together as they were before the cut, that is, with their vapor-deposited aluminum films 6 kept in contact with each other, to form an element 5. Then, aluminum films 7 and 8 are vapor-deposited on parts of the x surface (perpendicular to the a axis) and the y surface (perpendicular to the b axis) of the piece $5_1$ of the element 5, as shown in FIGS. 7a, 7b and 7c. As shown in FIG. 7d, the thus treated element 5 is placed in the vacuum upper compartment $9_0$ of a cylindrical container 9 separated by a copper hermetical partition wall 10 of copper from the lower compartment filled with liquid nitrogen. The attachment of the element 5 as shown in FIG. 7a onto the copper partition wall 10 is shown in detail in FIG. 7d. In FIG. 7d, support plates 11 made of teflon are fixed to the copper wall 10 and the element 5 is mounted on the inner walls of the supports 11 with its aluminum film 7 stuck to the inner vertical wall of the support 11 with an epoxy resin binder. A teflon plate 12 is stuck with an epoxy resin binder to the surface of the element 5 opposite to the surface carrying the film 7, and the plate 12 is mechanically connected with a force exerting rod 13 by means of a gearing mechanism so as to receive mechanical force externally. A teflon plate 14 is stuck with an epoxy resin binder to the surface of the element 5 carrying the aluminum film 8 and the plate 14 is mechanically connected with a force exerting rod 15 by means of a gearing mechanism so as to be shifted forward and backward in the direction of the b axis. The above-mentioned cylindrical container 9 is immersed in liquid nitrogen accomodated in a Dewar vessel 16. Windows provided in the cylindrical container 9 and the vessel 16 for passing a light beam into and out of the KDP element 5 are indicated at 17 and 18. With this structure, the KDP element 5 is maintained at about −160° C or below so that it exhibits a ferroelastic characteristic. Now, if none of the force exerting rods 13 and 15 is operated, light I incident perpendicularly on the surface of the piece $5_1$ is reflected by the aluminum films 6 and 7 and goes out of the piece $5_1$ as is seen from FIG. 7b. Next, if both the rods 13 and 15 are operated to apply a stress to the teflon plate 12 in the direction of the $b$ axis of the element 5 and a tension to the teflon plate 14 in the direction of the a axis of the element 5, the $a$- and $b$-axes of the KDP element 5 can be interchanged, and also the refractive index of the element 5 is changed so that the incident light I reflected by the aluminum films 6 and 8 as shown in FIG. 7c cannot leave the element 5. In this way, the KDP element 5 can function as an optical switching device.

In this embodiment (Example 2), the forces were simultaneously applied to the element 5, that is, the stress and the tension were simultaneously applied to the x and y surfaces, respectively. However, it is, of course, possible to apply a stress or a tension to either one of the x and y surfaces. In the last case, however, the force to be exerted on the element must be relatively greater than the former case where forces are applied simultaneously to the x and y surfaces.

In the embodiment just described, a KDP single crystal is used, but other crystals belonging to the species $\overline{4}2mFmm2$ may also be used. For example, the GMO crystal has a ferroelastic property at room temperature. Consequently, it does not require a cryostat employing liquid nitrogen. However, its variation in the refractive index due to the change in the state of polarization (polarization reversal) is smaller than that of the KDP crystal. Hence, the GMO crystal is less effective than the KDP crystal in practical applications.

In the above embodiments, the GMO and KDP crystals used were cut in such a manner that two pairs of parallel opposite surfaces thereof are perpendicular to the a and the b axes, respectively. In general, however, the pairs of surfaces need not be perpendicular to the axes but they have only to make certain desired angles with the axes, respectively.

EXAMPLE 3

Figure 8A:
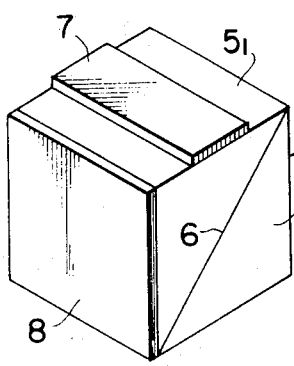
FIGS. 8a, 8b, 8c and 8d are schematic diagrams showing various aspects of an optical path switching device or light deflecting device according to the present invention.
Figure 8B:
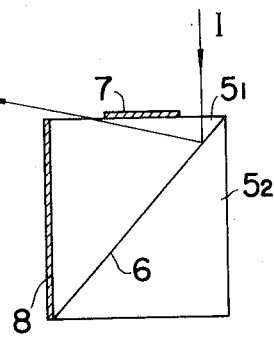
Figure 8C:
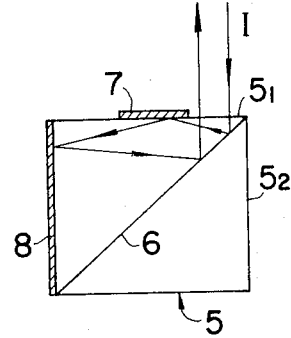
Figure 8D:
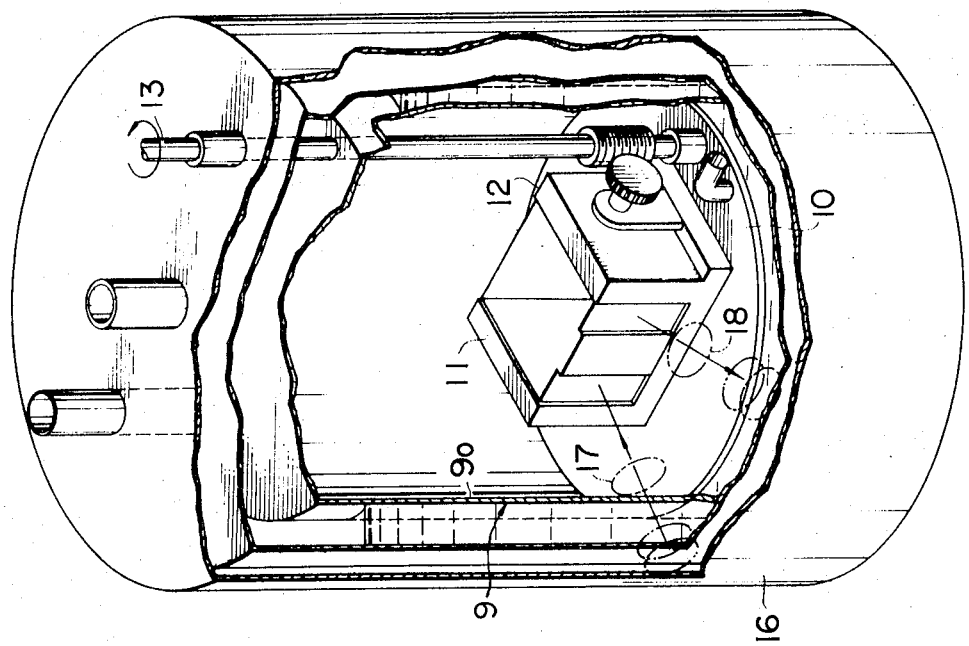

As in Example 2, a KDP single crystal in the form of a parallelepiped having its parallel opposite surfaces being made perpendicular to the a, b and c axes, respectively, of the single crystal, is cut along a plane parallel to the c axis and making an angle smaller than 45° with the a axis (or the b axis) into two pieces $5_1$ and $5_2$, as shown in FIGS. 8a, 8b and 8c. After aluminum films 6 are deposited on the cut surfaces of the split pieces by vapor deposition technique, the pieces $5_1$ and $5_2$ are joined together as they were before splitting to form an element 5. Aluminum films 8 and 7 are vapor-deposited on the entire area of the x surface (perpendicular to the a axis) and on the central portion of the y surface (perpendicular to the b axis) of the piece $5_1$ of the KDP crystal element 5, as shown in FIGS. 8a, 8b and 8c. The element 5 so treated is placed in a vacuum-tight upper compartment $9_0$ separated in a cylindrical container 9 by a hermetical partition wall 10 of copper from the lower compartment filled with liquid nitrogen. The way of attachment of the element 5 as shown in FIG. 8a onto the copper partition wall 10 is shown in detail in FIG. 8d. In FIG. 8d, an L-shaped teflon support plate 11 is rigidly fixed to the copper wall 10 and the element 5 is mounted on the inner walls of the support 11 with its aluminum film 8 deposited on the x surface stuck to the inner vertical wall of the support plate 11 with an epoxy resin binder. A teflon plate 12 is stuck with an epoxy resin binder to the other x surface of the element 5 opposite to the surface carrying the film 8, and the plate 12 is in turn connected mechanically with a force exerting rod 13 by means of a gearing mechanism so as to apply a stress and a tension to the element 5 in the direction of the a axis thereof. The cylindrical container 9 is immersed in liquid nitrogen accomodated in a Dewar vessel 16. Windows 17 and 18 for passing a light beam I into and out of the element 5 are provided as shown in FIG. 8d.

If the force exerting rod 13 is not operated, light I incident on the y surface of the piece $5_1$ of the KDP single crystal element 5 is once reflected by the aluminum film 6 and goes out of the y surface of the piece $5_1$, as seen in FIG. 8b. On the other hand, if a stress or a tension is applied to the element 5 through the operation of the rod 13 so that the state of the element 5 is shifted, that is, its polarization is reversed, then the incident light I, on the basis of the same phenomenon as described in previous Example 2, is reflected by the aluminum films 6, 7 and 8 and then turned back in the direction opposite to that of the indicent light I, as seen in FIG. 8c. Thus, the KDP element can function as a light path switching device or a light deflector means.

We claim:

1. A ferroelastic device comprising:
a crystal of ferroelastic material;
means provided on said crystal for applying a stress greater in magnitude than the coercive stress of said crystal to said crystal, so as to cause a transition of the state thereof; and
means coupled to said crystal for utilizing a change in one of the even-rank polar tensorial properties and the similar anisotropic properties of said crystal caused by the state transition of said crystal.

2. A ferroelastic device comprising:
an element of crystal belonging to the "species $\overline{4}2mFmm2$," said crystal having two pairs of parallel end surfaces cut perpendicularly to the a- and the b-axes of said crystal, respectively;
means provided on one pair of said two pairs of surfaces for applying a stress greater in magnitude than the coercive stress of said crystal to said pair of surfaces in a direction perpendicular to said pair of surfaces to cause a transition of the crystal state; and
means coupled to said crystal element for uitlizing a change in one of the even-rank polar tensorial properties and the similar anisotropic properties of said crystal element caused by the state transition of said crystal element.

3. A ferroelastic device comprising:
an element of crystal belonging to the "species $\overline{4}2mFmm2$," said crystal having two pairs of parallel end surfaces cut perpendicularly to the a- and the b-axes of said crystal, respectively;
means provided on said surfaces for applying to one pair of said two pairs of parallel surfaces a pressure perpendicular to said one pair of surfaces and to the other pair of said two pairs of parallel surfaces a tension perpendicular to said other pair of surfaces to cause a transition of the crystal state; and
means coupled to said crystal element for utilizing a change in one of the even-rank polar tensorial properties and the similar anisotropic properties of said crystal element caused by the state transistion of said crystal element.

4. A ferroelastic device according to claim 2, comprising electrodes provided on a pair of crystal surfaces perpendicular to the c-axis of said crystal element, said electrodes being short-circuited.

5. A ferroelastic device according to claim 3, comprising electrodes provided on a pair of crystal surfaces perpendicular to the c-axis of said crystal element, said electrodes being short-circuited.

6. A ferroelastic device comprising:
an element of crystal belonging to the "species $\overline{4}2mFmm2$," said crystal having two pairs of parallel end surfaces cut not perpendicularly to the a- and the $b$-axes of said crystal, respectively;

means provided on a first pair of said two pairs of surfaces for applying a stress greater in magnitude than the coercive stress of said crystal element to said first pair of surfaces to cause a transition of the crystal state; and means coupled to said crystal element for utilizing a change in one of the even-rank polar tensorial properties and the similar anisotropic properties of said crystal element caused by the state transition of said crystal element.

7. A ferroelastic device comprising:

an element of crystal belonging to the "species $\overline{4}2mFmm2$," said crystal having two pairs of parallel end surfaces cut not perpendicularly to the $a$- and the $b$-axes of said crystal, respectively;

means provided on said surfaces for applying to a first pair of said two pairs of parallel surfaces a pressure perpendicular to said first pair of surfaces and to a second pair of said two pairs of parallel surfaces a tension perpendicular to said second pair of surfaces to cause a transition of the crystal state; and means coupled to said crystal element for utilizing a change in one of the even-rank polar tensorial properties and the similar anisotropic properties of said crystal element caused by the state transition of said crystal element.

8. An optical switching device comprising:

a rectangular ferroelastic element made of two right-angled triangular prisms of potassium dihydrogen phosphate crystal, each having two end faces perpendicular to the $a$- and $b$-axes thereof respectively forming a right-angle and a sloped face parallel to the $c$-axis and forming angles not greater than 45° with the $a$- and $b$-axes, the two sloped faces being affixed to form said element;

means for applying stress at least equal to the coercive force of said potassium dihydrogen phosphate crystal onto a pair of opposite surfaces of said element;

reflection means provided on the entire area of said sloped face, on the entire area of one end face, to which no stress is applied, excepting the area through which a light beam is introduced, and on the entire area of the other end face, to which stress is applied, excepting the area through which a light beam in emitted, of one right angled triangular prism; and means for maintaining said element at least at a temperature of liquid nitrogen.

9. A device for deflecting light rays comprising:

a rectangular ferroelastic element made of two right-angled triangular prisms of potassium dihydrogen phosphate crystal, each having two end faces perpendicular to the $a$- and $b$-axes thereof, respectively, forming a right-angle and a sloped face parallel to the $c$-axis and forming angles not greater than 45° with the $a$- and $b$-axes, said two sloped faces being affixed to form said element;

means for applying stress at least equal to the coercive force of said potassium dihydrogen phosphate crystal onto a pair of opposite surfaces of said element;

reflection means provided on the entire areas of the sloped face and one end face to which stress is applied, and the entire area of the other end face to which no stress is applied excepting the areas through which a light beam is introduced and through which a light beam is emitted, of one right-angled triangular prism; and means for maintaining said element at least at a temperature of liquid nitrogen.

* * * * *